United States Patent
Sugimoto

(10) Patent No.: US 9,952,813 B2
(45) Date of Patent: Apr. 24, 2018

(54) NON-TRANSITORY COMPUTER-READABLE STORAGE MEDIUM STORING PRINT CONTROL PROGRAM AND PRINT CONTROL APPARATUS

(71) Applicant: KONICA MINOLTA, INC., Chiyoda-ku, Tokyo (JP)

(72) Inventor: Kunihiko Sugimoto, Hachioji (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 15/075,235

(22) Filed: Mar. 21, 2016

(65) Prior Publication Data

US 2016/0283178 A1 Sep. 29, 2016

(30) Foreign Application Priority Data

Mar. 24, 2015 (JP) ................. 2015-060764

(51) Int. Cl.
*G06F 3/12* (2006.01)
*H04N 1/00* (2006.01)
*G06K 15/02* (2006.01)
*G06K 9/00* (2006.01)

(52) U.S. Cl.
CPC ......... *G06F 3/1243* (2013.01); *G06F 3/1204* (2013.01); *G06F 3/1208* (2013.01); *G06F 3/1248* (2013.01); *G06F 3/1288* (2013.01); *G06K 9/00442* (2013.01); *G06K 15/1806* (2013.01); *G06K 15/1822* (2013.01); *H04N 1/00039* (2013.01); *H04N 1/00411* (2013.01); *H04N 2201/0094* (2013.01)

(58) Field of Classification Search
USPC ........................................ 358/1.15
See application file for complete search history.

(56) References Cited

U.S. PATENT DOCUMENTS

2004/0145755 A1 7/2004 Ishiguro
2008/0259392 A1* 10/2008 Tokumoto ............. G06F 3/1213
358/1.15

(Continued)

FOREIGN PATENT DOCUMENTS

JP 2004-174797 A 6/2004
JP 2006-235664 A 9/2006

*Primary Examiner* — Ngon Nguyen
(74) *Attorney, Agent, or Firm* — Buchanan Ingersoll & Rooney PC

(57) ABSTRACT

Provided is a non-transitory computer-readable storage medium storing a print control program which, when being executed by a processor of a print control apparatus, causes the print control apparatus to perform the following processing. The processing includes, obtaining specific information about a document file or an image processing apparatus; determining whether to conduct or skip an analysis of a file structure of the document file, on a basis of the specific information; and conducting or skipping the analysis in accordance with a result of the determining. The processing further includes, converting the document file into variable print data in response to receiving a result of the analysis; on conducting the analysis, outputting the variable print data to the image processing apparatus; and on skipping the analysis, outputting the document file to the image processing apparatus.

18 Claims, 13 Drawing Sheets

(56) References Cited

U.S. PATENT DOCUMENTS

2011/0007340 A1* 1/2011 Masuyama ........ G03G 15/5075
358/1.14
2015/0138589 A1* 5/2015 Minagawa ............ G06F 3/1205
358/1.14

* cited by examiner

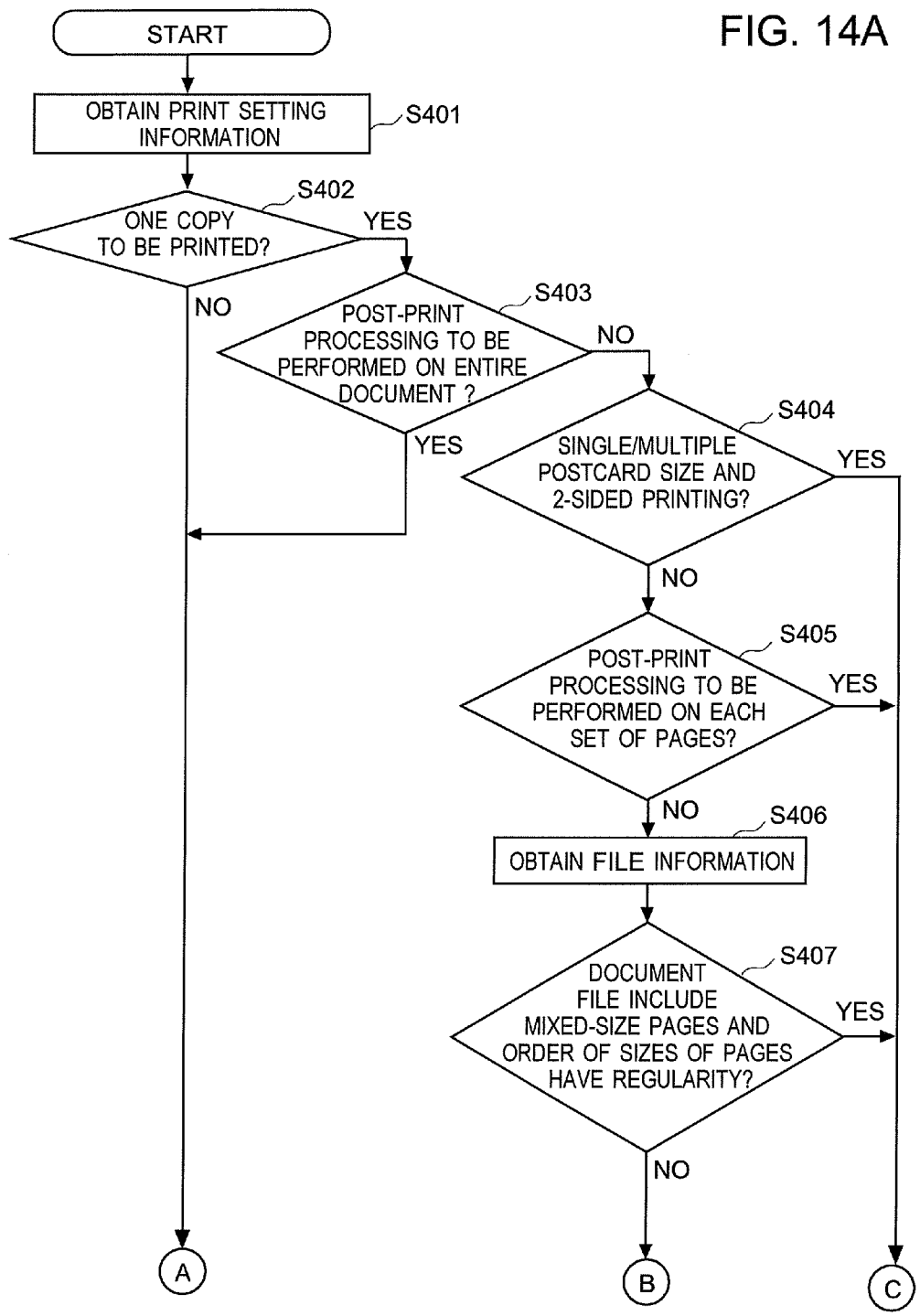

NON-TRANSITORY COMPUTER-READABLE STORAGE MEDIUM STORING PRINT CONTROL PROGRAM AND PRINT CONTROL APPARATUS

The entire disclosure of Japanese Patent Application No. 2015-060764 filed on Mar. 24, 2015 including description, claims, drawings, and abstract are incorporated herein by reference in its entirety.

TECHNICAL FIELD

The present invention relates to a non-transitory computer-readable storage medium storing a print control program and a print control apparatus. In particular, the present invention relates to a non-transitory computer-readable storage medium storing a print control program which, when being executed, causes an apparatus to analyze a file to be printed and create a file for variable data printing; and further relates to a print control apparatus, such as a print server, configured to execute the print control program.

BACKGROUND

Variable data printing is used for preparing direct mails and other purposes. In variable data printing, files described in PPML (Personalized Print Markup Language) or PDF (Portable Document Format)/VT (Variable Transactional) format have been used. In recent years, a situation that large-sized PDF files are sent to a print control apparatus (print server) for printing purpose is increasing. Since printing such a large-sized file needs a lot of time, there have been proposed techniques to reduce printing time by reducing the size of a file to be printed.

DESCRIPTION OF THE RELATED ART

As an example of variable data printing technology, Japanese Unexamined Patent Publication (JP-A) No. 2006-235664 discloses the following image forming system. The image forming system includes a server on which an 'image forming apparatus' application program has been installed, an input apparatus through which a user inputs image data, an image forming apparatus that creates an output image on the basis of the input data, and a host computing device. The 'image forming apparatus' application program includes a page description language conversion section, variable-data creating section, compressed-archive creating section, print-data storing section, GUI, object processing section, object managing section, and coordinate transformation section. The page description language conversion section converts objects into a page description language. The variable-data creating section, in response to receiving notice of completion of data processing within a region of objects to be reused, creates variable data for printing, on the basis of the name, image size and positional information of each object, and records the resulting data as a file. The compressed-archive creating section, in response to receiving notice from the variable-data creating section, puts the file of variable data and an object data file in one compressed archive. The print-data storing section records the data of the objects converted into the page description language, into a file. The object processing section notifies the variable-data creating section of the completion of the data processing within the region of objects to be reused. The object managing section registers the name, image size and positional information of each object. The coordinate transformation section transforms the positional information and registers the resulting information into an object list.

As another example, JP-A No. 2004-174797 (corresponding to US Patent Application Publication No. 2004/145755A1) discloses a print control system which controls print processing by transmitting print data received from a host apparatus, to a printing apparatus to which fixed portions of print data can be registered. The print control system includes a designing unit, registered-portion transmitting unit and variable-portion transmitting unit. The designing unit designs layout information including information for discriminating a fixed portion from a variable portion, on the basis of the print data corresponding to a first page received from the host apparatus. The registered-portion transmitting unit transmits to the printing apparatus a fixed portion of the print data out of the print data corresponding to the first page received from the host apparatus, in accordance with the information for discriminating a fixed portion from a variable portion out of the layout information designed by the designing unit. The variable-portion transmitting unit, after the registered-portion transmitting unit transmits the fixed portion of the print data, transmits a variable portion of the print data to the printing apparatus, in accordance with information for discriminating a fixed portion from a variable portion out of the layout information designed by the designing unit on the basis of the print data corresponding to the first page and the following pages received from the host apparatus.

In the above-described JP-A No. 2006-235664, the following processes are employed so as to achieve a reduction of time of data transmission to the printing apparatus (image forming apparatus) and a reduction of print processing in the printing apparatus. The processes include: (1) converting host-based print data streams into a page description language for each object; (2) checking whether there are objects which provide the same rendering contents; and (3) converting the data into a variable-data printing language in which objects can be reused, to reuse the objects, which provide the same rendering contents, checked in the process (2), by referring to the objects converted in the variable language in the process (1).

In the above-described JP-A No. 2004-174797, the following processes are employed so as to achieve a reduction of time of data transmission to the printing apparatus and reduction of print processing in the printing apparatus. The processes include: separating a fixed portion and a variable portion of print data from each other on the basis of logical information and layout information by which a fixed portion and a variable portion can be discriminated from each other, in processing of the first page of a material to be printed; registering the fixed portion of the print data into a storage device in the printing apparatus in advance so as not to perform duplicate processing on the second page and the fixed portions in other materials which have the same format and have been processed with print processing once; and transmitting just a variable portion to the printing apparatus.

As described above, the conventional technologies employ processes of analyzing an input file to be printed and converting the file into variable data for printing so as to reduce time of data transmission to a printing apparatus and print processing time in a printing apparatus. However, an input file to be printed is not usually data which can be converted into variable data for printing, and analyzing the file structure needs a certain period of time. If a system recognizes that the input file is not data which can be converted into variable data for printing, after analyzing all the pages of the input file, the time of analyzing the file structure is wasted and the system needs extra time to output printed matters, which is a problem.

SUMMARY

Aspects of the present invention are directed to non-transitory computer-readable storage media each storing print control program and print control apparatus, for controlling print processing with effectiveness.

A non-transitory computer-readable storage medium reflecting one aspect of the present invention stores a print control program to be executed in a print control apparatus. The print control apparatus outputs print data based on a document file to an image processing apparatus which performs raster image processing. The print control program, when being executed by a processor of the print control apparatus, causes the print control apparatus to perform the following processing. The processing comprises: obtaining specific information about a document file or the image processing apparatus; and analyzing a file structure of the document file. The analyzing the file structure includes determining whether to conduct or skip an analysis of a file structure of the document file on a basis of the specific information, and conducting or skipping the analysis in accordance with a result of the determining, where the analysis includes classifying contents of the document file into fixed data portions and variable data portions. The processing further comprises: converting the document file into variable print data, in response to receiving a result of the analysis; on conducting the analysis, outputting the variable print data to the image processing apparatus; and on skipping the analysis, outputting the document file to the image processing apparatus.

A print control apparatus reflecting one aspect of the present invention is a print control apparatus which outputs print data based on a document file to an image processing apparatus which performs raster image processing. The print control apparatus comprises: an information obtaining section that obtains specific information about a document file or the image processing apparatus; and a file-structure analyzing section that determines whether to conduct or skip an analysis of a file structure of the document file on a basis of the specific information, and conducts or skips the analysis in accordance with a result of the determining, where the analysis includes classifying contents of the document file into fixed data portions and variable data portions. The print control apparatus further comprises a data conversion section that, in response to receiving a result of the analysis, converts the document file into variable print data and outputs the variable print data to the image processing apparatus.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIGS. 14A and 14B are a flowchart illustrating an example of the operation of a print server pertaining to Example 4.

DESCRIPTION OF THE PREFERRED EMBODIMENTS

Hereinafter, an embodiment of the present invention will be described with reference to the drawings. However, the scope of the invention is not limited to the illustrated examples.

Non-transitory computer-readable storage media each storing a print control program and print control apparatuses as embodiments of the present invention, can control print processing with effectiveness for the following reasons.

A print control apparatus as an embodiment of the present invention (when executing a print control program) obtains specific information about a document file to be printed or an image processing apparatus. On the basis of the specific information obtained, the print control apparatus determines whether to conduct or skip an analysis of the file structure of the document file; and conducts or skips the analysis in accordance with a result of the determining. The print control apparatus converts the document file into variable print data, in response to receiving a result of the analysis. The print control apparatus outputs the variable print data as print data to the image processing apparatus, in the case of conducting the analysis; and outputs the document file as print data to the image processing apparatus, in the case of skipping the analysis.

Figure 1:
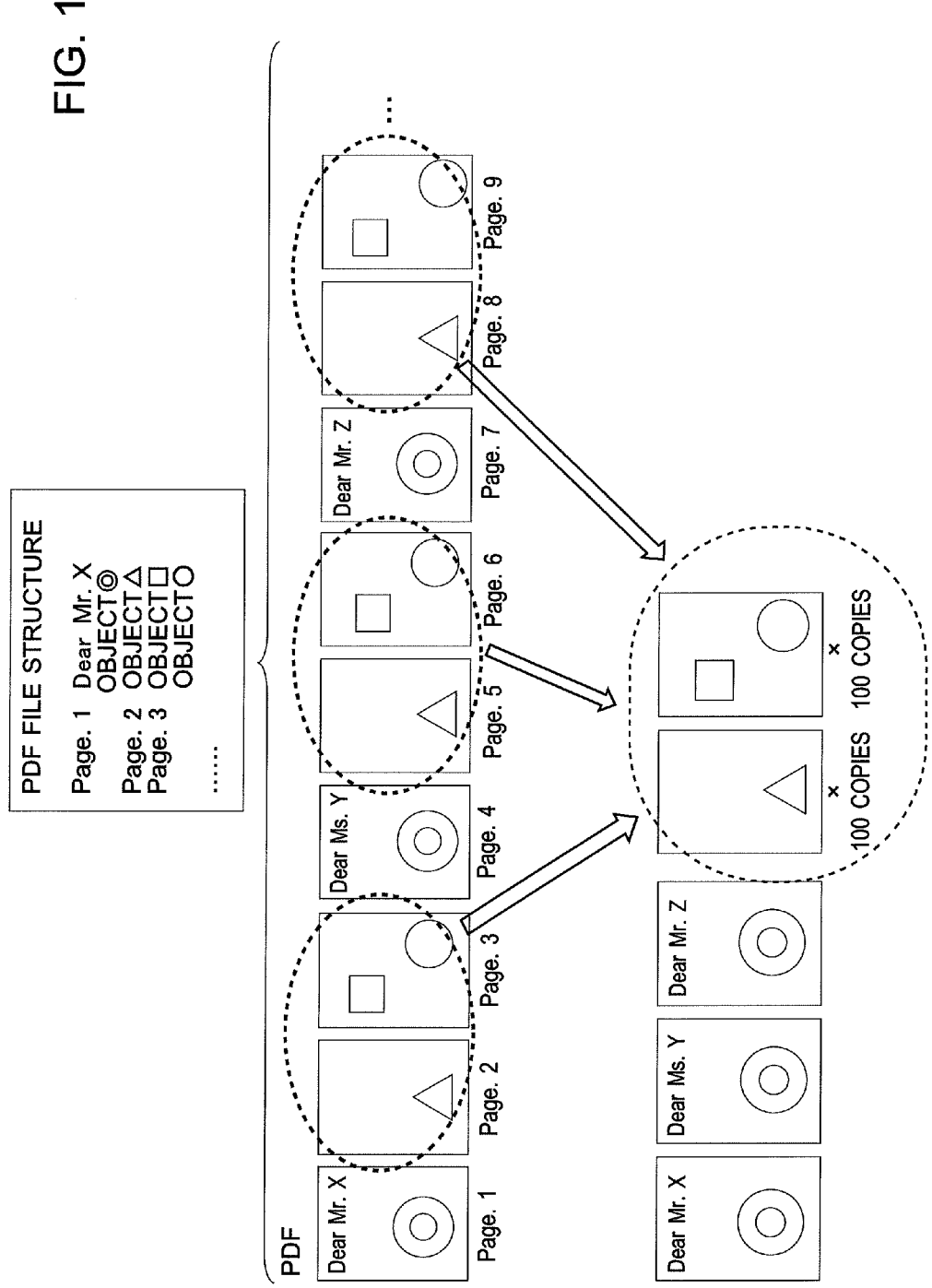
FIG. 1 is a schematic diagram illustrating an example of a way to create variable data for printing from a PDF file.
Figure 2:
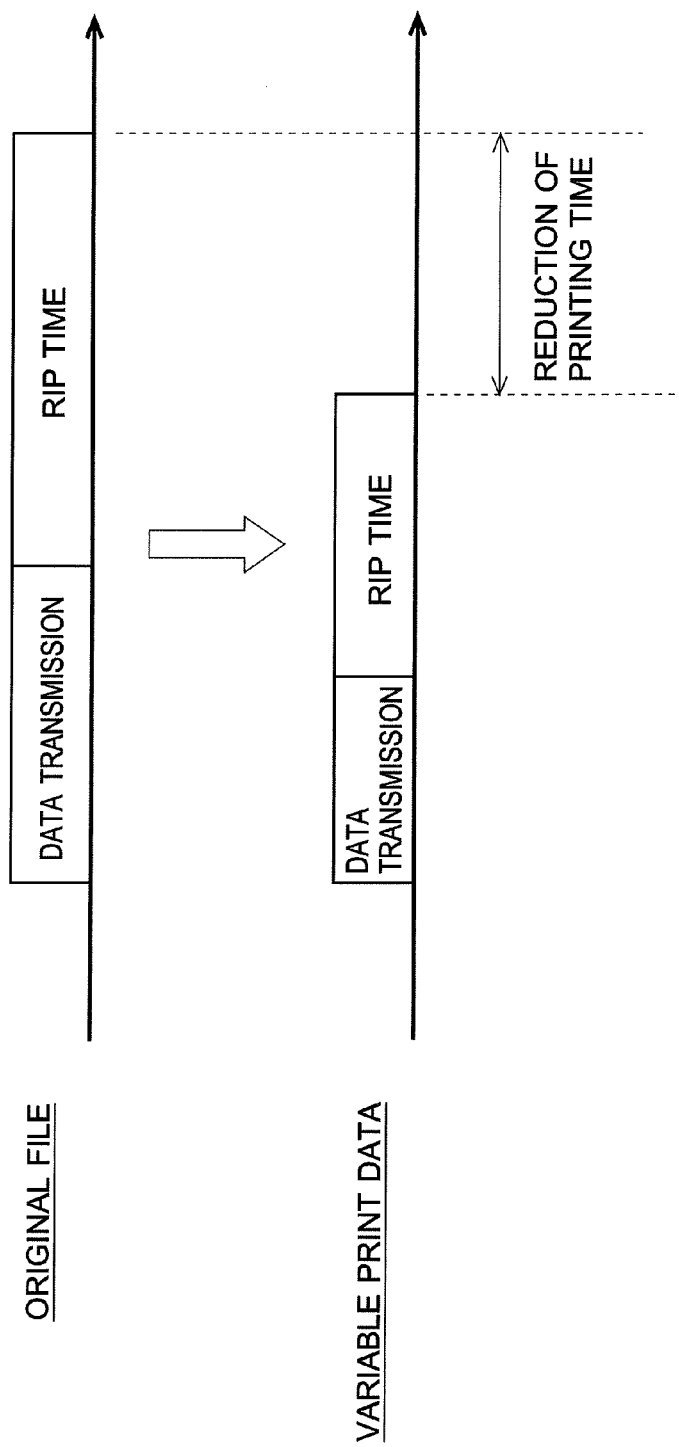
FIG. 2 is a schematic diagram illustrating an effect produced by converting a PDF file into variable data for printing.

As described in BACKGROUND, in recent variable data printing, a situation that large-sized PDF files are sent to a print server for printing purpose is increasing. FIG. 1 is a schematic diagram illustrating an example of a way to create variable data for printing, from a PDF file. In the example, pages 1, 4 and 7 correspond to variable data portions and pages 2, 3, 5, 6, 8 and 9 correspond to static (fixed) data portions. When such a PDF file is input into a print server, the file size and the number of pages of the file can be reduced by analyzing the structure of the file to extract the static (fixed) data portions (the portions surrounded by dashed lines in FIG. 1) from the file and adding or appending information of "static data portion×the number of copies" (for example, "Page. 2×100 copies" and "Page. 3×100 copies") to the file. FIG. 2 is a schematic diagram illustrating an effect on time spent for print processing, produced by converting a PDF file (an original file in the figure) into variable data for printing. As illustrated in FIG. 2, time of data transmission from a print server to a printing apparatus depends on the size of the document file to be printed, and RIP (raster image processing) time spent by the printing apparatus or a controller depends on the number of pages of the document file to be printed. Therefore, the reduction of the file size and the number of pages of the original file to be printed can shorten not only the data transmission time and the RIP time, but also the printing time of the file.

However, files input into a print server are not usually data which can be converted into variable data for printing, and analyzing the file structure as described above needs a certain period of time. Therefore, under the situation that, for example, a printing system recognizes that an input file is not data which can be converted into variable data for printing, after analyzing all the pages of the file, the time of analyzing the file structure is wasted. Particularly, a PDF file to be used for variable data printing sometime contains as many pages as about 10000 pages, and if such a PDF file is input into the print server, a huge number of time would be wasted under the above-described situation.

In view of that, a print server as one embodiment of the present invention, performs the following control. The print server obtains specific information about a file to be printed or an image processing apparatus, such as print setting information, file information of the file to be printed, and device information indicating an operation status of a controller. On the basis of the specific information obtained, the print server determines whether to conduct or skip an analysis of the file structure of the file to be printed (for example, whether or not the file is a specific type of data which can be converted into variable print data, whether or not there is a sufficient time to analyze the file structure, and so on). On the basis of a result of the determination, the print server conducts or skips the analysis of the file structure, and converts the file to be printed into variable print data in response to receiving a result of the analysis. The print server outputs (sends) the variable print data (in the case of conducting the analysis) or the file to be printed (in the case of skipping the analysis) as print data to the image processing apparatus.

With this control, even under the situation that after analyzing the file structure, the print server has recognized that the file is not specific type of data which can be converted into variable print data, the problem that time to analyze the file structure is wasted can be avoided before it happens, and effective print processing can be achieved.

EXAMPLES

Example 1

Figure 3:
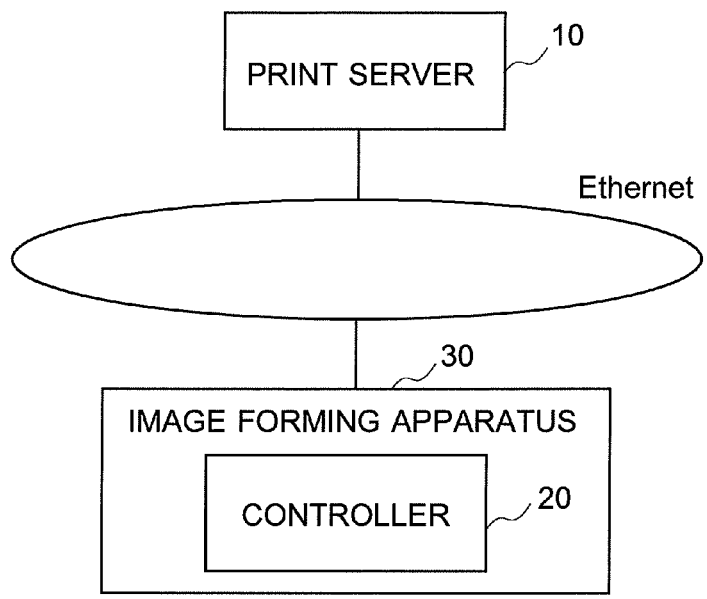
FIG. 3 is a schematic diagram illustrating an example of the structure of a printing system pertaining to Example 1.
Figure 4:
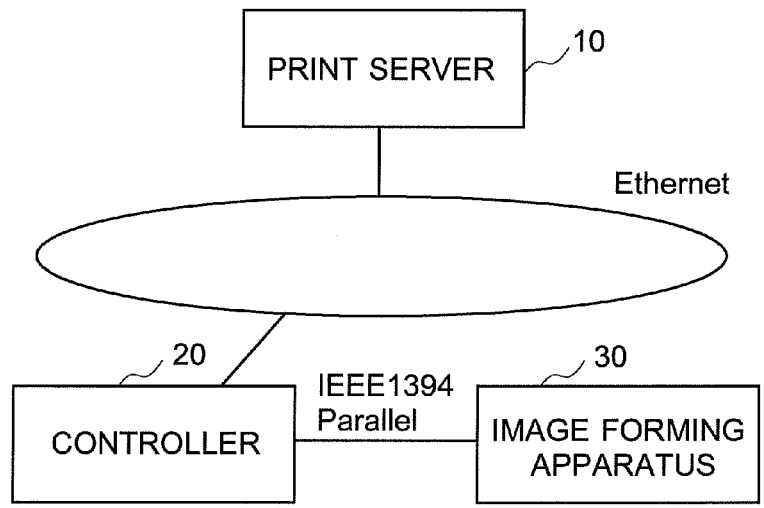
FIG. 4 is a schematic diagram illustrating another example of the structure of a printing system pertaining to Example 1.
Figure 8:
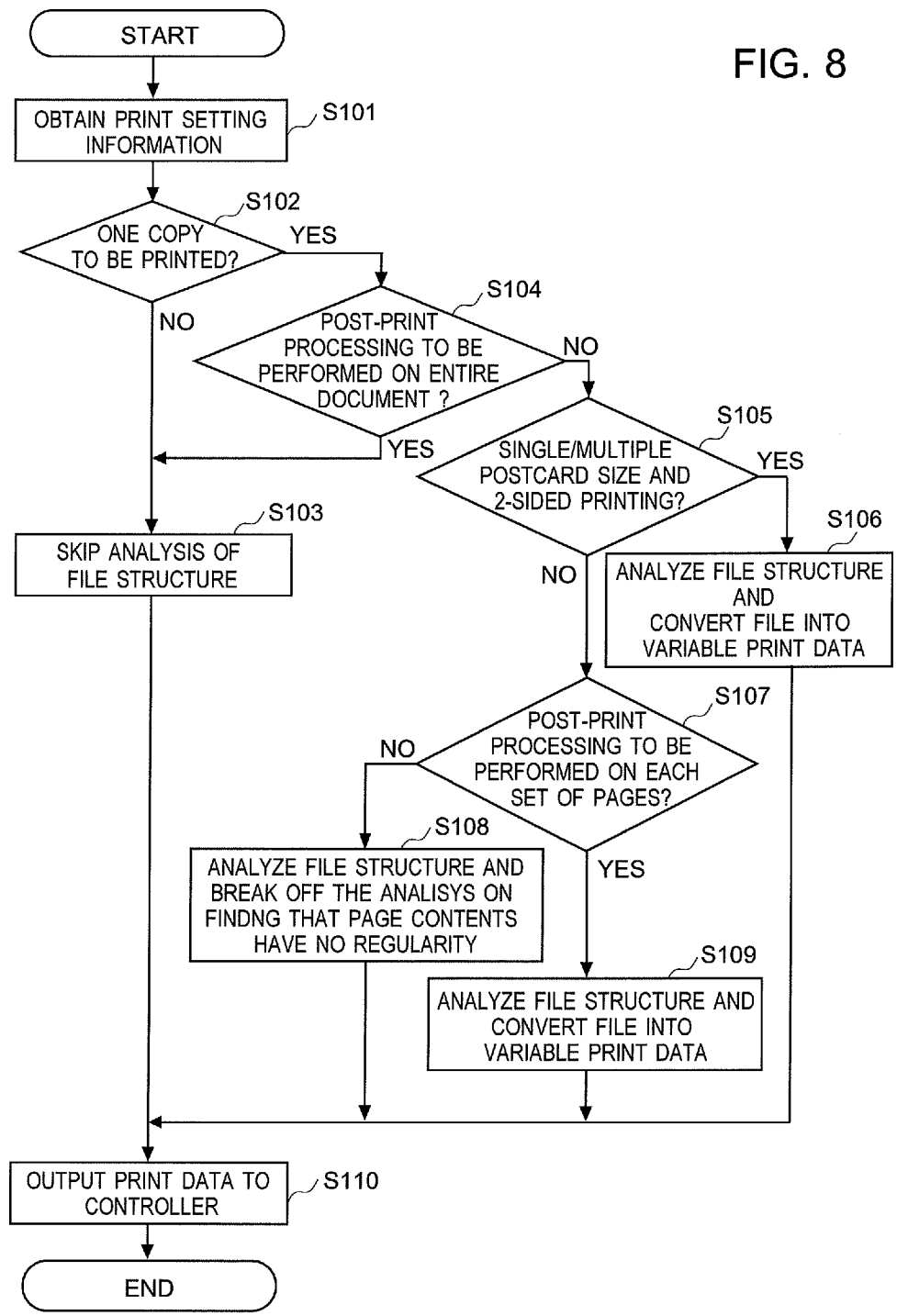
FIG. 8 is a flowchart illustrating an example of the operation of the print server pertaining to Example 1.
Figure 9:
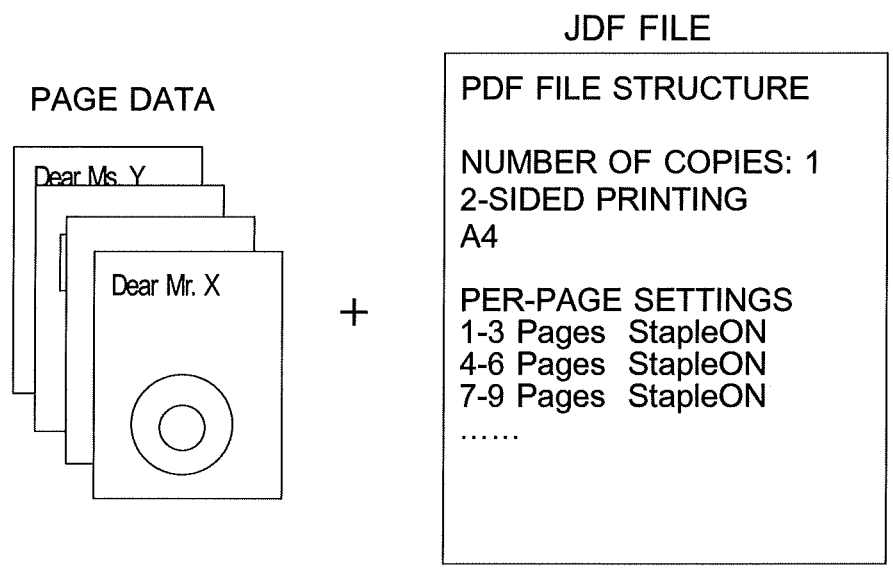
FIG. 9 is a diagram illustrating an example of the structure of a file to be input into a print server.

In order to describe the above-mentioned embodiment of the present invention in more detail, description will be given to a print control program, a print control apparatus, and a print control method pertaining to Example 1 with reference to FIG. 3 to FIG. 9. Each of FIG. 3 and FIG. 4 is a schematic diagram illustrating an example of the structure of a printing system of the present example. FIGS. 5A and 5B, FIG. 6 and FIG. 7 are block diagrams illustrating an example of the structure of a print server, controller and image forming apparatus, respectively. FIG. 8 is a flowchart illustrating an example of the operation of the print server of the present example. FIG. 9 is a diagram illustrating an example of the structure of a file to be input into the print server. In the following descriptions, data or specific data which can be converted into variable print data represents data including static (fixed) data portions, which provide the same printing contents in plural pages. Further, variable data for printing or variable print data represents data in which the static (fixed) data portions which provide the same printing contents in plural pages are defined by using the number of copies of the static data portions to be printed so as to reduce the size and the number of pages contained in the file. In the following descriptions, the format of either of a file to be printed, specific data which can be converted into variable print data, and variable print data should not be limited to a specific format and may be an arbitrary format.

As illustrated in FIG. 3, printing system of the present example includes print server 10 (print control apparatus) and image forming apparatus 30 including controller 20, which are communicable by a communication network and are located on an intranet. In the printing system illustrated in FIG. 3, controller 20 which is an image processing apparatus for performing a raster image processing, is incorporated in image forming apparatus 30. Alternatively, as illustrated in FIG. 4, the printing system of the present example may include controller 20 as an individual device, which is an image processing apparatus, and include image forming apparatus 30 connected to the controller 20. Further, in FIGS. 3 and 4, printing system is composed of print server 10, controller 20 and image forming apparatus 30, but alternatively, the printing system may further include one or more client apparatuses which create a file to be sent for printing purpose to print server 10. As a standard of the communication network, Ethernet and other standards may be used. For data transfer from the printer controller 20 to the image forming apparatus 30, IEEE1394, parallel, etc. may be used in addition to Ethernet. Hereinafter, on the assumption that the printing system has the structure illustrated in FIG. 4, each apparatus is described in detail.

Figure 5A:
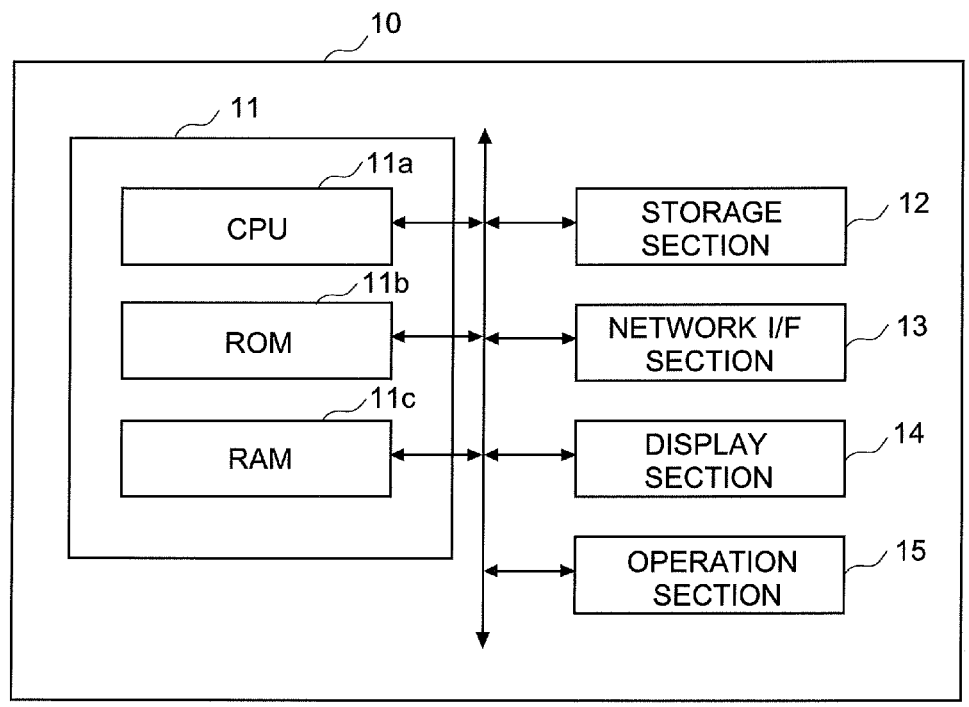
FIGS. 5A and 5B are block diagrams illustrating an example of the structure of a print server pertaining to Example 1.
Figure 5B:
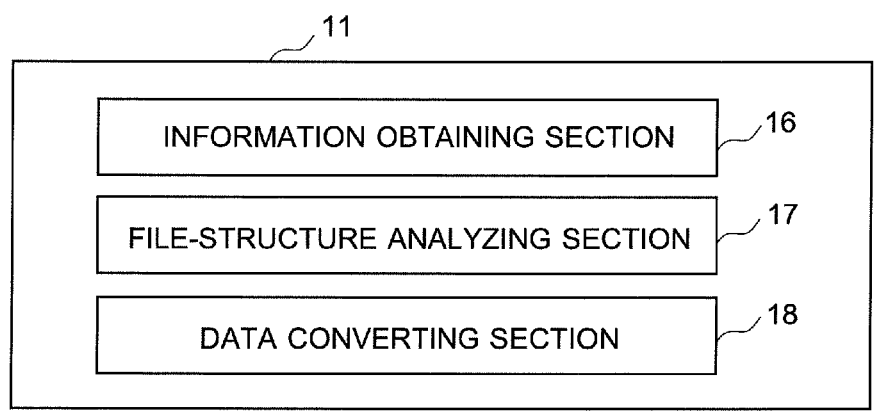

Print Server:

Print server 10 is a print control apparatus that is configured to send print data based on a document file to controller 20 or image forming apparatus 30. As illustrated in FIG. 5A, print server 10 includes control section 11, storage section 12 and network interface (I/F) section 13, and if needed, further includes display section 14, operation section 15 and other sections.

Control section 11 includes CPU (Central Processing Unit) 11a and memories, such as ROM (Read Only Memory) 11b and RAM (Random Access Memory) 11c, and these are connected to each other through a bus. CPU 11a reads out programs from ROM 11b or storage section 12, loads the programs onto RAM 11c, and executes the programs, thereby performing the overall control of print server 10.

Storage section 12 is constituted by a memory, such as a HDD (Hard Disk Drive) and a SSD (Solid State Drive). The storage section 12 stores programs (including a print control program) which, when being executed, cause the CPU 11a to control various sections of the apparatus; files to be printed (hereinafter, referred to as document files), which include files input for printing purpose to print server 10 and files created by using an application program in print server 10; variable print data created from a document file, and other data.

Network I/F section 13 includes components such as a NIC (Network Interface Card) and a modem, and establishes data communications with controller 20 or image forming apparatus 30 connected via the network, and sends a document file or variable print data created from the document file to the controller 20 or image forming apparatus 30.

Display section 14 includes a display, such as a LCD (Liquid Crystal Display) and the like, and displays various screens about print instructions. Operation section 15 includes a device, such as a mouse and a keyboard, and receives various operations about print instructions performed by a user thereon.

Control section 11, as illustrated 5B, also works as information obtaining section 16, file-structure analyzing section 17 and data converting section 18.

Information obtaining section 16 obtains print setting information (for example, pieces of information about settings of the paper size to be used for printing a document file, double-sided printing to be performed on the document file, the number of copies to be printed, post-print processing to be performed on a document file, and so on) appended to a document file input into print server 10 or created by print server 10.

File-structure analyzing section 17 determines whether to conduct or skip an analysis of the file structure of a given document file, on the basis of the print setting information obtained by information obtaining section 16. In other words, on the basis of the print setting information, file-structure analyzing section 17 determines whether the document file is a specific type of data which can be converted into variable print data, and then, if determining that the document file is a specific type of data which can be converted into variable print data, file-structure analyzing section 17 conducts an analysis of the file structure of the document file to classify pages of the document file into pages each including a variable data portion and pages each composed of a static (fixed) data portion. For example, if the print setting information includes a piece of information about the number of copies to be printed, and one copy is specified to be printed in the print setting information, file-structure analyzing section 17 determines that there is a high probability that the document file is a specific type of data which can be converted into variable print data (in other words, estimates that the document file is the specific type of data), conducts the analysis of the file structure of the document file and sends a result of the analysis to data converting section 18. For another example, if the print setting information includes a piece of information about the number of copies to be printed and a piece of information about post-print processing (finishing) to be performed on the printed document, and further if one copy and is specified to be printed and post-print processing (finishing) is specified to be performed (post-print processing on the entire document is specified) in the print setting information, file-structure analyzing section 17 determines that there is a low probability that the document file is a specific type of data which can be converted into variable print data (in other words, estimates that the document file is not the specific type of data), skips the analysis of the file structure of the document file and outputs the document file as print data to data converting section 18. For another example, if the print setting information includes a piece of information about a paper size to be used for printing the document file and a piece of information of double-sided printing to be performed on the document file, and further if a postcard size or a size of multiple postcards is specified as the paper size and double-sided printing to be performed on the document file is specified in the print setting information, file-structure analyzing section 17 determines that there is a high probability that the document file is a specific type of data which can be converted into variable print data (in other words, estimates that the document file is the specific type of data), conducts the analysis of the file structure of the document file and outputs the document file as print data to data converting section 18.

Data converting section 18 converts the document file into variable print data on the basis of a result of the analysis conducted by file-structure analyzing section 17. In concrete terms, data converting section 18 converts a page composed of a static (fixed) data portion in the document file into a piece of data in which the position of the page in the document and the number of copies of the page to be printed are specified. Then, data converting section 18 outputs the variable print data to controller 20 as an image processing apparatus which performs raster image processing.

Herein, the above-mentioned information obtaining section 16, file-structure analyzing section 17 and data converting section 18 may be constituted as hardware devices. Alternatively, the information obtaining section 16, file-structure analyzing section 17 and data converting section 18 may be provided by a print control program which causes the control section 11 to function as these sections when being executed by CPU 11$a$. That is, the control section 11 may be configured to serve as the information obtaining section 16, file-structure analyzing section 17 and data converting section 18, when CPU 11$a$ executes the print control program.

Figure 6:
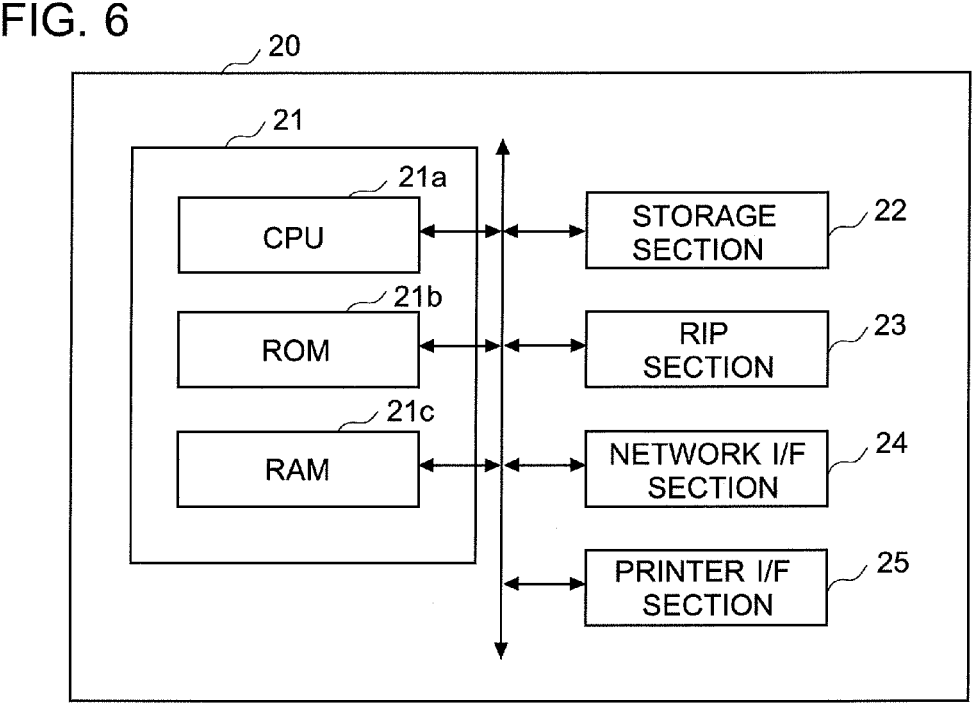
FIG. 6 is a block diagram illustrating an example of the structure of an image forming apparatus pertaining to Example 1.

Controller:

Controller 20 is an image processing apparatus which is configured to create image data which can be printed by image forming apparatus 30 on the basis of print data. As illustrated in FIG. 6, controller 20 includes control section 21, storage section 22, RIP section 23, network interface (I/F) section 24 and printer interface (I/F) section 25.

Control section 21 includes CPU 21$a$ and memories, such as ROM 21$b$ and RAM 21$c$, and these are connected to each other through a bus. CPU 21$a$ reads out programs from ROM 21$b$ or storage section 22, loads the programs onto RAM 21$c$, and executes the programs, thereby performing the overall control of controller 20.

Storage section 22 is constituted by a memory, such as a HDD and a SSD. The storage section 22 stores programs (including a print control program) which, when being executed, cause the CPU 21$a$ to control various sections of the controller 20; document files; variable print data created from a document file; print image data created from a document file or variable print data; and other data.

RIP section 23 includes an image processing ASIC (Application Specific Integrated Circuit). RIP section 23 is configured to create raster image data by converting a document file or variable print data obtained from print server 10 into a bitmap, and create data of print images for pages of the document, if needed, by performing screening or image processing on the raster image data. RIP section 23 is further configured to, if needed, perform screening, tone correction, image density balance adjustment, thinning, halftone dotting processing, etc. on the data of print images.

Network I/F section 24 includes components such as a NIC (Network Interface Card) and a modem, and establishes data communications with print server 10 connected via the network, and receives a document file or variable print data. Printer I/F section 25 is an exclusive interface for connecting to the image forming apparatus 30, and sends data of print images to the image forming apparatus 30.

Figure 7:
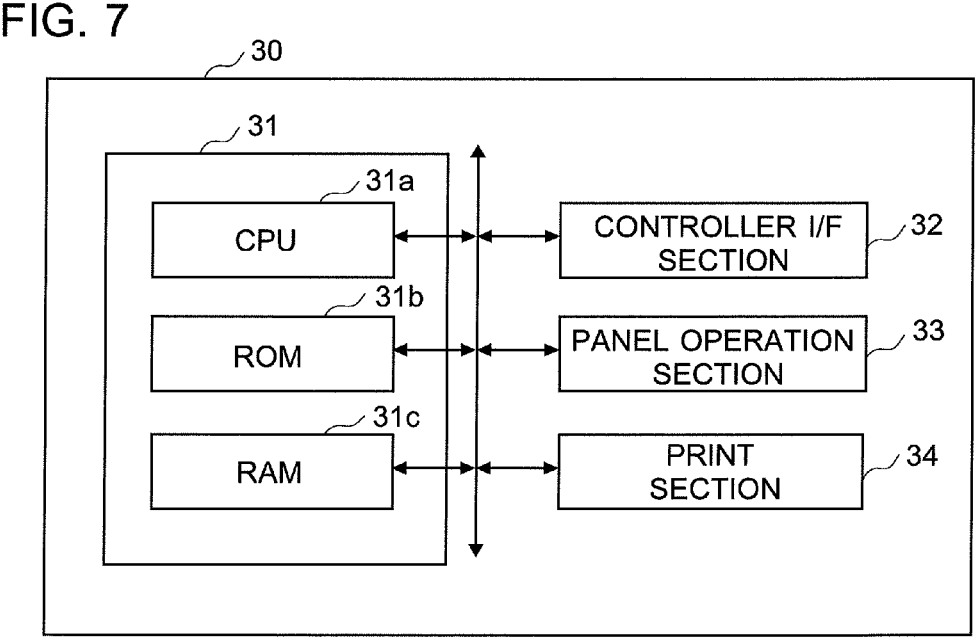
FIG. 7 is a block diagram illustrating an example of the structure of a controller pertaining to Example 1.

Image Forming Apparatus:

Image forming apparatus 30 is a printer, multi-functional peripheral (MFP) or the like, and as illustrated in FIG. 7, includes control section 31, controller interface (I/F) section 32, panel operation section 33 and print section (engine) 34.

Controller 31 includes CPU 31a and memories, such as ROM 31b and RAM 31c, and these are connected to each other through a bus. CPU 31a reads out programs from ROM 31b, loads the programs onto RAM 31c, and executes the programs, thereby performing the overall control of image forming apparatus 30.

Controller I/F section 32 is an exclusive interface for connecting to controller 20, and receives data of print images and others from controller 20.

Panel operation section 33 is a device, such as a touch panel which includes a display unit like a LCD and transparent electrodes arranged on the display unit in a lattice shape, and is configured to display various screens about printing thereon and allow a user to various operations about printings thereon.

Print section 34 is an engine which executes print processing based on a print image. In concrete terms, print section 34 performs following processes. That is, exposure units perform exposure processing by irradiating the corresponding photoreceptor drums, which are charged by respective charging units, with a laser beam in accordance with an image, to form latent images on the photoreceptor drums. Developing units develop the latent images by adhering charged toners onto the photoreceptor drums, and the developed toner images are transferred onto a transfer belt (first transfer processing), further are transferred from the transfer belt onto a sheet of paper (second transfer processing), and are fixed onto the sheet by fixing unit.

The structures illustrated in FIGS. 3 to 7 just show examples of a printing system pertaining to the present example. It should be noted that the structure and control of each apparatus constituting the printing system can be modified appropriately as far as image forming apparatus 30 can print a document file or variable print data output from print server 10.

Hereinafter, description is given to an example of the operation of the print server 10 having the above-described structure. CPU 11a loads the print control program stored in ROM 11b or storage section 12 onto RAM 11c and executes the program, thereby executing processing of each step shown in the flowchart in FIG. 8.

First, control section 11 (image obtaining section 16) of print server 10 obtains print setting information appended to a document file input into print server 10 or created in print server 10 (S101). In this example, as illustrated in FIG. 9, it is assumed that JDF (Job Definition Format) file is input into print server 10 together with page data of a document. The JDF file includes descriptions of the number of copies of a document to be printed, settings of double-sided printing to be performed on a document file, a paper size to be used for printing a document file, and per-page settings (post-print processing to be performed per page).

Next, control section 11 (file-structure analyzing section 17) determines whether to analyze the file structure of the document file, that is, determines, on the basis of the print setting information obtained, whether the document file is a specific type of data which can be converted into variable print data. First, on the basis of the print setting information obtained, the control section 11 (file-structure analyzing section 17) confirms whether the number of copies to be printed is set to one copy (S102). In many types of variable data printing, there are created printed matters including different contents by using a static (fixed) data portion as a common printing element and changing a variable data portion successively for each printed matter. Therefore, it can be considered that plural copies of the same printed matter would not be printed in variable printing. Therefore, if the number of copies to be printed is not set to one copy, control section 11 (file-structure analyzing section 17) determines that there is a low probability that the document file is a specific type of data which can be converted into variable print data (estimates that the document file is not the specific type of data), skips an analysis of the file structure of the document file (S103), and outputs the document file as it is to controller 20 (S110).

If confirming that the number of copies to be printed is set to one copy in S102, the control section 11 may determine that there is a high probability that the document file is a specific type of data which can be converted into variable print data and conduct an analysis of the file structure of the document file; or may further determine whether to analyze the file structure of the document file by using another kind of print setting information. In the example of FIG. 8, control section 11 (file-structure analyzing section 17) confirms, on the basis of the print setting information obtained, whether post-print processing or finishing to be performed on the entire document is specified in the print setting information (S104). In many types of variable data printing, there are created printed matters including different contents by changing a variable data portion successively for each printed matter. Therefore, it can be considered that the entire document would not be output in a booklet format or the entire document would not be stapled in variable data printing. Therefore, when post-print processing (finishing), such as making a booklet or stapling is set to the entire document, control section 11 (file-structure analyzing section 17) determines that there is a low probability that the document file is a specific type of data which can be converted into variable print data (estimates that the document file is not the specific type of data), skips an analysis of the file structure of the document file (S103), and outputs the document file as it is to controller 20 (S110).

If confirming that post-print processing on the entire document in S104 is not specified, control section 11 (file-structure analyzing section 17) confirms, on the basis of print setting information obtained, whether a paper size to be used for printing the document file is set of a postcard size of a size of multiple postcards and whether double-sided printing to be performed on the document file is specified in the print setting information (S105). Variable data printing is used for direct mailing, and direct mails include postcards, which include standard-sized postcards, folded postcards in the size of double or multiple postcards and so on, each having one side on which an address is printed and the other side on which an advertisement is printed. Therefore, if confirming that the paper size to be used for printing is set to a postcard size or a size of multiple postcards and double-sided printing is specified in the print setting information, control section 11 (file-structure analyzing section 17) determines that there is a high probability that the document file is a specific type of data which can be converted into variable print data (estimates that the document file is the specific type of data), and conducts an analysis of the file structure of the document file, and then control section 11 (data converting section 18) converts the document file into variable print data in accordance with a result of the analysis (S106) and outputs the variable print data to controller 20 (S110).

If confirming that the paper size to be used for printing is not set to a postcard size or a size of multiple postcards or double-sided printing is not specified in S105, control section 11 (file-structure analyzing section 17), on the basis of print setting information obtained, confirms per-page settings (post-print processing to be performed per page), that is, confirms whether post-print processing to be performed on each set of a certain number of pages is set in the print setting information (S107). Many printed matters are prepared with variable data printing by binding each set of pages to form a booklet or stapling each set of pages. Therefore, if confirming that making a booklet or stapling is set to each set of pages (each set of a certain number of pages), control section 11 (file-structure analyzing section 17) determines that there is a high probability that the document file is a specific type of data which can be converted into variable print data (estimates that the document file is the specific type of data), and conducts an analysis of the file structure of the document file, and control section 11 (data converting section 18) converts the document file into variable print data in accordance with a result of the analysis (S109) and outputs the variable print data to controller 20 (S110).

On the other hand, if confirming that making a booklet or stapling is not set to each set of pages (each set of a certain number of pages), it is hardly considered that there is a high probability that the document file is a specific type of data which can be converted into variable print data. However, with variable data printing, plural printed matters are created by inserting pages each composed of a static (fixed) data portion into pages each composed of a variable data portion, and it is still possible that the document file is a specific type of data which can be converted into variable print data, if the document to be printed has a page structure with regularity (like periodicity). Therefore, if making a booklet or stapling is not set to each set of pages (each set of a certain number of pages), control section 11 (file-structure analyzing section 17) conducts an analysis of the file structure of the document file, and further determines whether the document has the page structure with regularity, for example, determines whether there are static (fixed) portions in the document file, while conducting the analysis. On determining that the document file has the page structure without regularity (without static or fixed data portions) after the analysis of the file structure was conducted on a predetermined number or more of pages, control section 11 (file-structure analyzing section 17) determines that there is a low probability that the document file is a specific type of data which can be converted into variable print data, brakes off the analysis of the file structure halfway (S108), and outputs the document file as it is to controller 20 (S110).

As described above, the print control apparatus performs the following control. That is, the control includes determining, on the basis of print setting information, such as settings of the number of copies of a document to be printed, settings of the paper size to be used for printing the document file, settings of double-sided printing to be performed on the document file, and setting of post-print processing or finishing, whether or not there is a high probability that the document file is a specific type of data which can be converted into variable print data (estimate whether or not the document file is the specific type of data). The control further includes, on determining that there is a low probability that the document file is a specific type of data which can be converted into variable print data, outputting the document file as it is to controller 20 without conducting an analysis of the file structure; and, on determining that there is a high probability that the document file is a specific type of data which can be converted into variable print data, conducting the analysis of the file structure, converting the document file into variable print data on the basis of a result of the analysis, and outputting the variable print data to controller 20. With this control, a problem that time to analyze the file structure is wasted can be avoided before it happens, and effective print processing can be achieved.

In the above-described flow, when determining that post-print processing on the entire document is not specified in the print setting information in S104, the control section 11 of print server 10 further determines whether to conduct or skip an analysis of the file structure of a document file, on the basis of settings of the paper size to be used for printing and settings of double-sided printing in S105; and when determining that the paper size is not set to a postcard size or a size of multiple postcards or that double-sided printing is not specified in print setting information, the control section 11 of print server 10 further determines whether to conduct or skip the analysis, on the basis of per-page settings (post-print processing to be performed per page) in S107. It should be noted that the order of these determining steps can be modified appropriately. For example, the control section 11 of print server 10 may perform the determining steps of S105 and S107 in response to determining that the number of copies to be printed is set to one copy in S102, or may perform the determining step of S107 in response to determining that post-print processing on the entire document is not specified in S104.

Example 2

Figure 10:
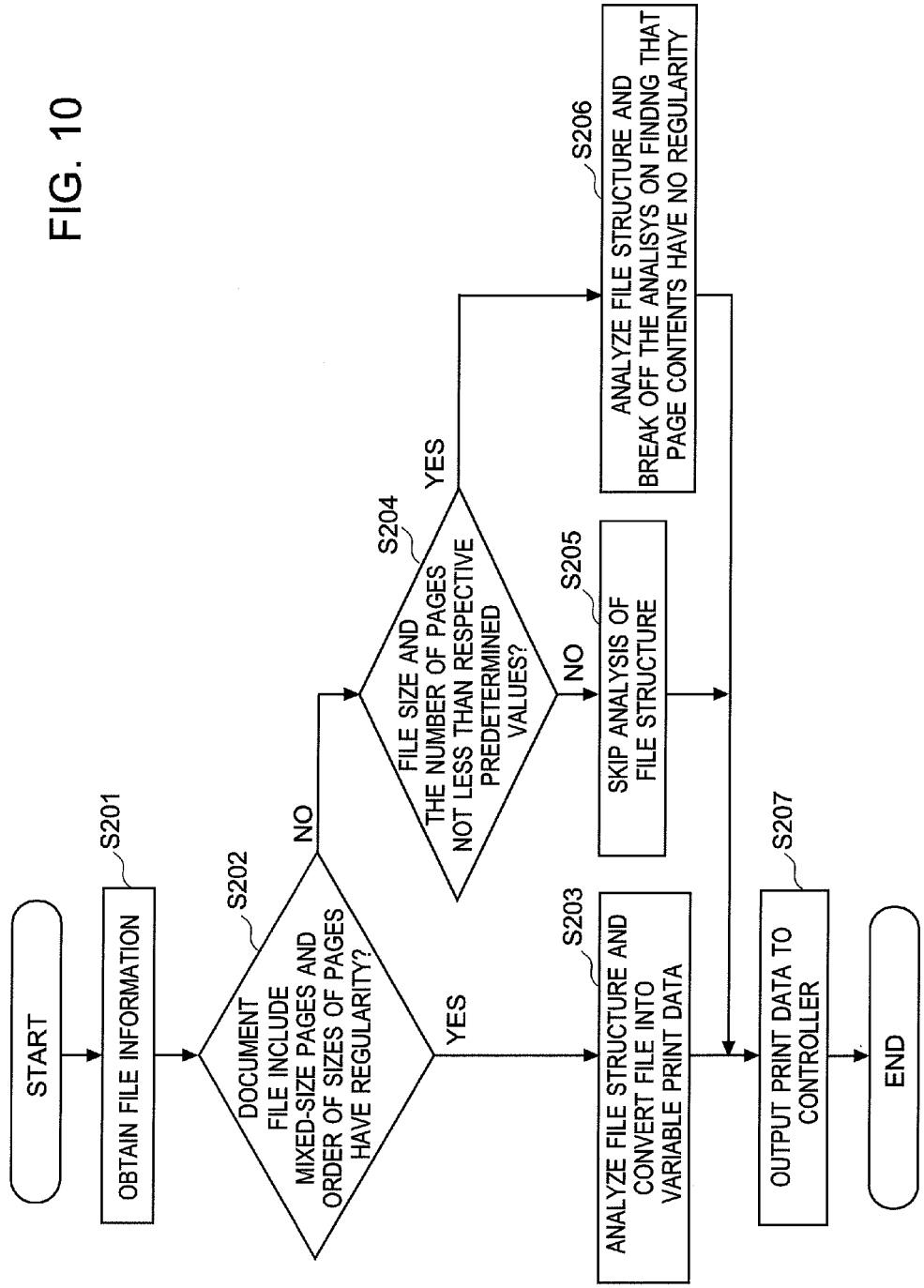
FIG. 10 is a flowchart illustrating an example of the operation of the print server pertaining to Example 2.
Figure 11:
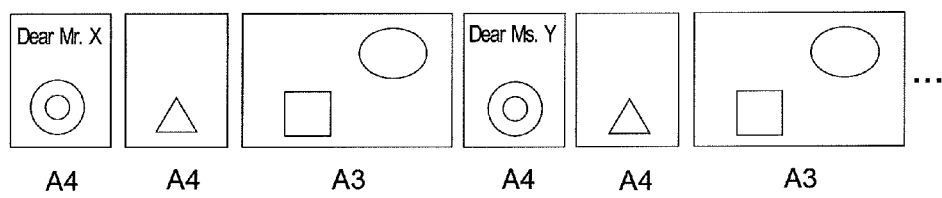
FIG. 11 is a diagram illustrating an example of the structure of a file to be input into a print server.

Next, description will be given to a print creation control program, a print control apparatus, and a print control method pertaining to Example 2 with reference to FIG. 10 and FIG. 11. FIG. 10 is a flowchart illustrating an example of the operation of the print server pertaining to the present example, and FIG. 11 is a diagram illustrating an example of the structure of a PDF file.

In the above-mentioned Example 1, descriptions were given to an example that page data with a JDF file including descriptions of print setting information are used as a document file which is input to a print server. However, other types of document file which does not include print setting information (for example, a PDF file) can be input into a printer server for printing purpose. In view of that, in the present example, the print server is configured to determine, on receiving a file not including print setting information, whether there is a high probability that the document file is a specific type of data which can be converted into variable print data, on the basis of file information, and then conduct or skip an analysis of the file structure of the document file on the basis of a result of the determination.

In this processing, the structure of printing system is the same as that of Example 1, illustrated in FIG. 1 to FIG. 7. However, the print server 10 of the present example is configured to perform the following control. That is, the control section 11 (information obtaining section 16) of the print server 10 obtains, from the header of the document file, file information about a document file, such as information of the paper sizes of pages contained in the file, the file size and the number of pages contained in the file. Further, the control section 11 (file-structure analyzing section 17) determines whether to conduct or skip an analysis of the file structure of the document file, on the basis of the file information. For example, if the document file containing mixed-size pages and an order of paper sizes of the pages having a regularity, the control section 11 (file-structure analyzing section 17) determines that there is a high probability that the document file is a specific type of data which can be converted into variable print data (estimates that the document file is the specific type of data), and conducts the analysis of the file structure. On the other hand, if the document file does not include mixed-size pages or the order of the sizes of pages does not have a regularity, the control section 11 further determines whether the file size and the number of pages are equal to or greater than respective predetermined numbers. If at least one of the file size and the number of pages is less than the predetermined number, the control section 11 (file-structure analyzing section 17) determines that there is a low probability that the document file is a specific type of data which can be converted into variable print data (estimates that the document file is not the specific type of data), and skips the analysis of the file structure. On the other hand, if the file size and the number of pages are equal to or greater than respective predetermined numbers, the control section 11 (file-structure analyzing section 17) determines that there is a high probability that the document file is a specific type of data which can be converted into variable print data (estimates that the document file is not the specific type of data), and conducts the analysis of the file structure.

Hereinafter, description is given to an example of the operation of the print server 10. CPU 11*a* loads the print control program stored in ROM 11*b* or storage section 12 onto RAM 11*c* and executes the program, thereby executing processing of each step shown in the flowchart in FIG. 10.

First, control section 11 (image obtaining section 16) of print server 10 obtains file information, such as information of the paper sizes of pages, the file size and the number of pages, from a header of the document file input into print server 10 or created in print server 10 (S201). In this example, it is assumed that a PDF file as a document file is input into print server 10. The PDF file is composed of, for example, data of pages of a document, as illustrated in FIG. 11.

Next, control section 11 (file-structure analyzing section 17) determines whether to conduct or skip an analysis of the file structure of the document file, that is, determines, on the basis of the file information obtained, whether the document file is a specific type of data which can be converted into variable print data. First, on the basis of the file information obtained, the control section 11 (file-structure analyzing section 17) confirms whether the document file includes mixed-size pages (document to be printed onto mixed-size sheets) and confirms whether the order of the sizes of pages has a regularity (S202). In variable data printing, since a printed matter is created by combining various kinds of document, many of document files for variable data printing contain mixed-size pages the order of the sizes of which causes a regularity. Therefore, when the document file includes mixed-size pages and the order of the sizes of pages has a regularity (in the example of FIG. 11, the document file includes a mixture of A4-size pages and A3-size pages, and every third page is a A3-size page), control section 11 (file-structure analyzing section 17) determines that there is a high probability that the document file is a specific type of data which can be converted into variable print data (estimates that the document file is the specific type of data) and conducts an analysis of the file structure of the document file, and control section 11 (data converting section 18) converts the document file into variable print data in accordance with a result of the analysis (S203) and outputs the variable print data to controller 20 (S207).

If the document file does not include mixed-size pages or the order of the sizes of pages does not have a regularity in S202, it is hardly considered that there is a high probability that the document file is a specific type of data which can be converted into variable print data. However, in variable data printing, plural printed matters having different contents are created by using static (fixed) portions and variable data portions, and it can be considered that the file size and the number of pages of the document file can become great to a certain extent. Therefore, if the document file does not include mixed-size pages and the order of the sizes of the pages does not have a regularity, control section 11 (file-structure analyzing section 17) confirms, on the basis of the file information, whether the file size and the number of pages of the document file are equal to or greater than certain values predetermined respectively (S204). If at least one of the file size and the number of pages of the document file is less than the certain value, control section 11 (file-structure analyzing section 17) determines that there is a low probability that the document file is a specific type of data which can be converted into variable print data, skips the analysis of the file structure (S205), and outputs the document file as it is to controller 20 (S207).

On the other hand, if the file size and the number of pages of the document file are equal to or greater than the respective values, control section 11 (file-structure analyzing section 17) determines that there is a high probability that the document file is a specific type of data which can be converted into variable print data (estimate whether that the document file is the specific type of data), and conducts an analysis of the file structure of the document file. The control section 11 (file-structure analyzing section 17) further determines whether the document has the page structure with regularity, for example, determines whether there are static (fixed) portions in the document file, while conducting the analysis. On determining that the document file has the page structure without regularity (without static or fixed data portions) after the analysis of the file structure was conducted on a predetermined number or more of pages, control section 11 (file-structure analyzing section 17) determines that there is a low probability that the document file is a specific type of data which can be converted into variable print data, brakes off the analysis of the file structure halfway (S206), and outputs the document file as it is to controller 20 (S207).

As described above, the print control apparatus performs the following control. That is, the control includes determining, on the basis of file information, such as information of paper sizes of pages contained in a document file, the file size and the number of pages contained in a document file, whether there is a high probability that the document file is a specific type of data which can be converted into variable print data. The control further includes, on determining that there is a low probability that the document file is a specific type of data which can be converted into variable print data, outputting the document file as it is to controller 20 without conducting an analysis of the file structure; and, on determining that there is a high probability that the document file is a specific type of data which can be converted into variable print data, conducting the analysis of the file structure, converting the document file into variable print data on the basis of a result of the analysis, and outputting the variable print data to controller 20. With this control, a problem that time to analyze the file structure is wasted can be avoided before it happens, and effective print processing can be achieved.

In the above-described flow, when determining that the document file does not include mixed-size pages or the order of the sizes of the pages does not have a regularity in S202, the control section 11 of print server 10 further determines whether to conduct an analysis of the file structure of a document file, on the basis of the file size and the number of pages in S204. It should be noted that the order of these determining steps can be modified appropriately. For example, the control section 11 of print server 10 may perform the determining on the basis of the file size and the number of pages prior to other determining steps.

Example 3

Figure 12:
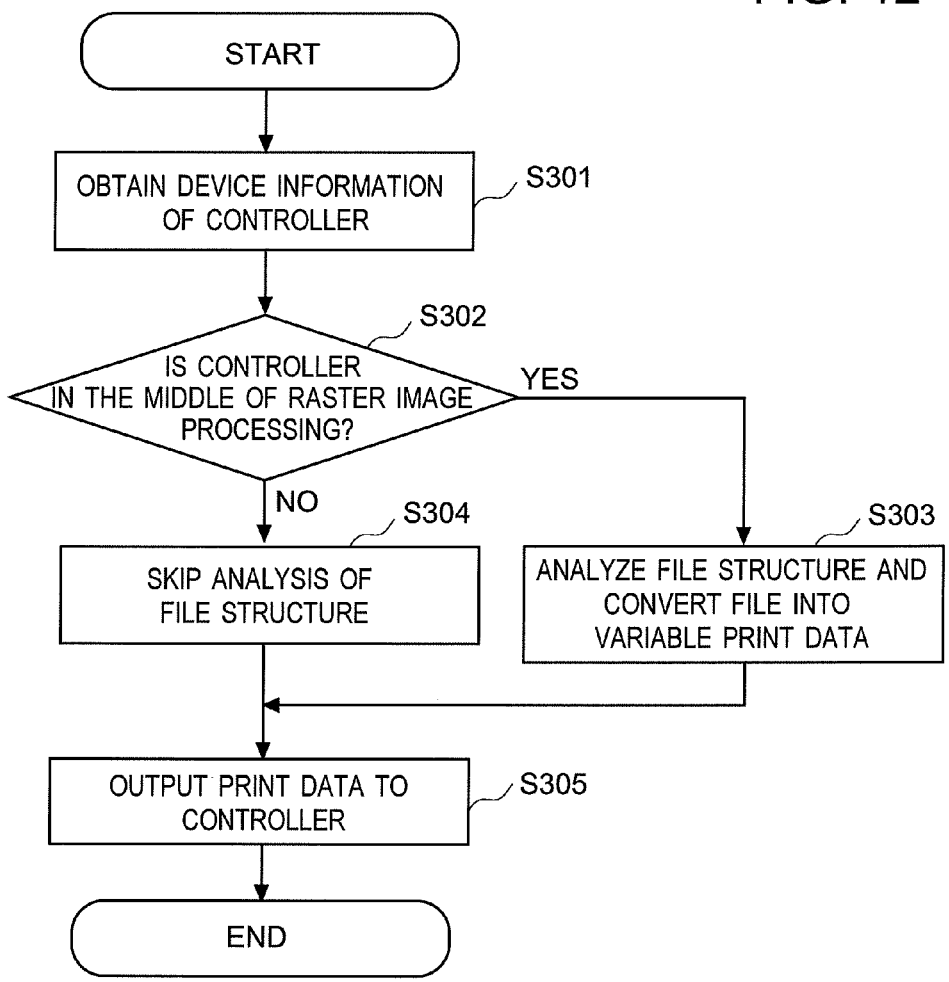
FIG. 12 is a flowchart illustrating an example of the operation of the print server pertaining to Example 3.
Figure 13:
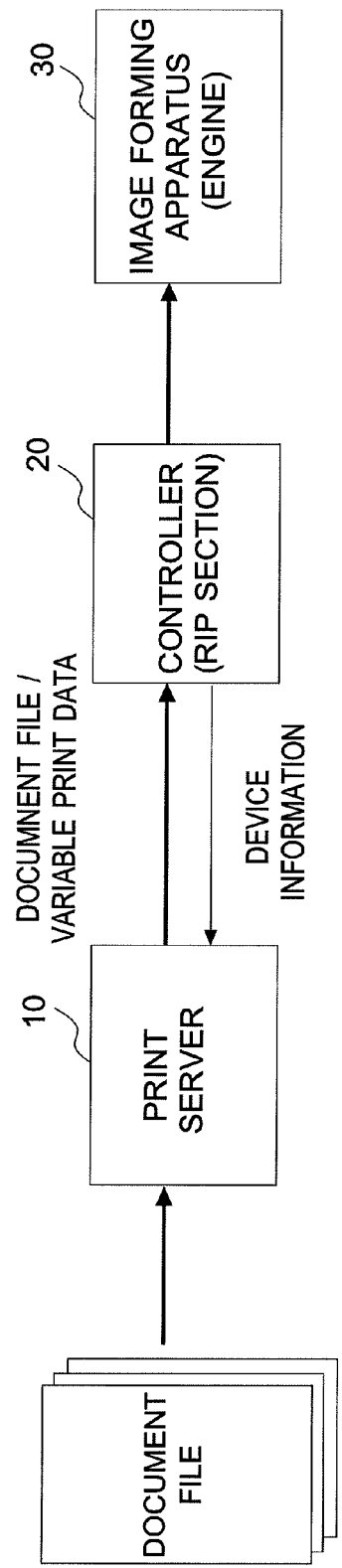
FIG. 13 is a diagram illustrating an example of the status of a printing system pertaining to Example 3.

Next, description will be given to a print creation control program, a print control apparatus, and a print control method pertaining to Example 3 with reference to FIG. 12 and FIG. 13. FIG. 12 is a flowchart illustrating an example of the operation of the print server pertaining to the present example, and FIG. 13 is a schematic diagram illustrating an example of the status of the printing system.

In the above-mentioned Examples 1 and 2, descriptions were given to an example that the print server is configured to determine whether to conduct or skip an analysis of the file structure of a document file on the basis of the document file. In one situation that the printing system is in a certain state (for example, a state that controller 20 as image processing apparatus is in the middle of raster image processing), controller 20 cannot start raster image processing immediately, in response to receiving a document file output from the print server 10. In such a situation, print processing can be completed earlier by conducting an analysis of the file structure of the document file. In another situation that the controller 20 as image processing apparatus is not in the middle of raster image processing, controller 20 can start raster image processing immediately after receiving a document file. In view of that, in the present example, the print server is configured to determine whether there is a high probability that the document file is a specific type of data which can be converted into variable print data, on the basis of the operation status of the printing system (for example, the operations status of the image processing apparatus).

In this processing, the structure of printing system is the same as that of Example 1, illustrated in FIG. 1 to FIG. 7. However, as illustrated in FIG. 13, print server 10 in the present example is configured to perform the following control. That is, the control section 11 of the print server 10 obtains, from controller 20 as an image processing apparatus performing raster image processing, device information indicating an operation status of the printing system (an operation status of the image processing apparatus), for example, whether the system is in the middle of performing raster image processing. On the basis of the device information obtained, the control section 11 determines whether to conduct or skip an analysis of the file structure of the document file. According to a result of the analysis, the control section 11 outputs the document file as it is to controller 20 without conducting the analysis of the file structure; or conducts the analysis of the file structure, converts the document file into variable print data on the basis of a result of the analysis of the file structure, and outputs the variable print data to controller 20.

In concrete terms, control section 21 of controller 20 outputs device information indicating the state of the controller 20 itself (in particular, the operation status of RIP section 23) to print server 10. Control section 11 (information obtaining section 16) of print server 10 obtains device information from controller 20, and control section (file-structure analyzing section 17) determines whether to conduct or skip an analysis of the file structure of the document file, on the basis of the device information. For example, if controller 20 is in the middle of raster image processing, the control section 11 (file-structure analyzing section 17) determines that the control section 11 has time enough to conduct an analysis of the file structure of the document file, and then conducts the analysis of the file structure.

Hereinafter, description is given to an example of the operation of the print server 10. CPU 11a loads the print control program stored in ROM 11b or storage section 12 onto RAM 11c and executes the program, thereby executing processing of each step shown in the flowchart in FIG. 12. In the present example, it is assumed that the document file has been input into print server 10 as illustrated in FIG. 13. Alternatively, the document file may be created by print server 10. As the document file, a combination of page data and JDF file including descriptions of print setting information may be used as shown in Example 1, or a PDF file which does not include print setting information as shown in Example 2.

First, control section 11 (image obtaining section 16) of print server 10 obtains device information from controller 20 (S301). In this example, control section 11 obtains information about whether or not controller 20 is in the middle of performing raster image processing.

Next, control section 11 (file-structure analyzing section 17) determines whether to conduct or skip an analysis of the file structure of the document file, that is, determines, on the basis of the device information, whether the document file is a specific type of data which can be converted into variable print data. As illustrated in FIG. 12, if controller 20 is in the middle of performing raster image processing, controller 20 hardly starts raster image processing on a newly input document file immediately, in response to receiving the document file output to controller. Therefore, control section 11 (file-structure analyzing section 17) conducts an analysis of the file structure of a document file in accordance with a result of the analysis, and control section 11 (data conversion section 18) converts the document file into variable print data (S303), and outputs the variable print data to controller 20 (S305).

On the other hand, if controller 20 is not in the middle of performing raster image processing, controller 20 can immediately start raster image processing on a newly input document file, in response to receiving the document file output to controller. Therefore, control section 11 (file-structure analyzing section 17) skips an analysis of the file structure of the document file (S304), and outputs the document file as it is to controller 20 (S305).

As described above, the print control apparatus is configured to perform the following control. That is, the control includes determining whether to conduct or skip an analysis of the file structure of a document file, on the basis of device information indicating the operation status of the printing system (the operation status of image processing apparatus), for example, whether controller 20 being image processing apparatus is in the middle of performing raster image processing. The control further includes, in accordance with a result of the determining, outputting the document file as it is to controller 20 without conducting an analysis of the file structure; or conducting the analysis of the file structure, converting the document file into variable print data on the basis of a result of the analysis, and outputting the variable print data to controller 20. With this control, a problem that time to analyze the file structure is wasted can be avoided before it happens, and effective print processing can be achieved.

In the above-described flow, the control section 11 of print server 10 determines whether to conduct or skip an analysis of the file structure of the document file, on the basis of device information indicating the operation status of RIP section 23 of controller 20. The information to be used as a criterion of the determination should not be limited to the device information as described above, and it should be noted that arbitrary information indicating the operation status of any apparatus in the printing system, for example, information indicating the operation status of print section 34 of image forming apparatus 30, can be used for the criterion.

Example 4

Figure 14B:
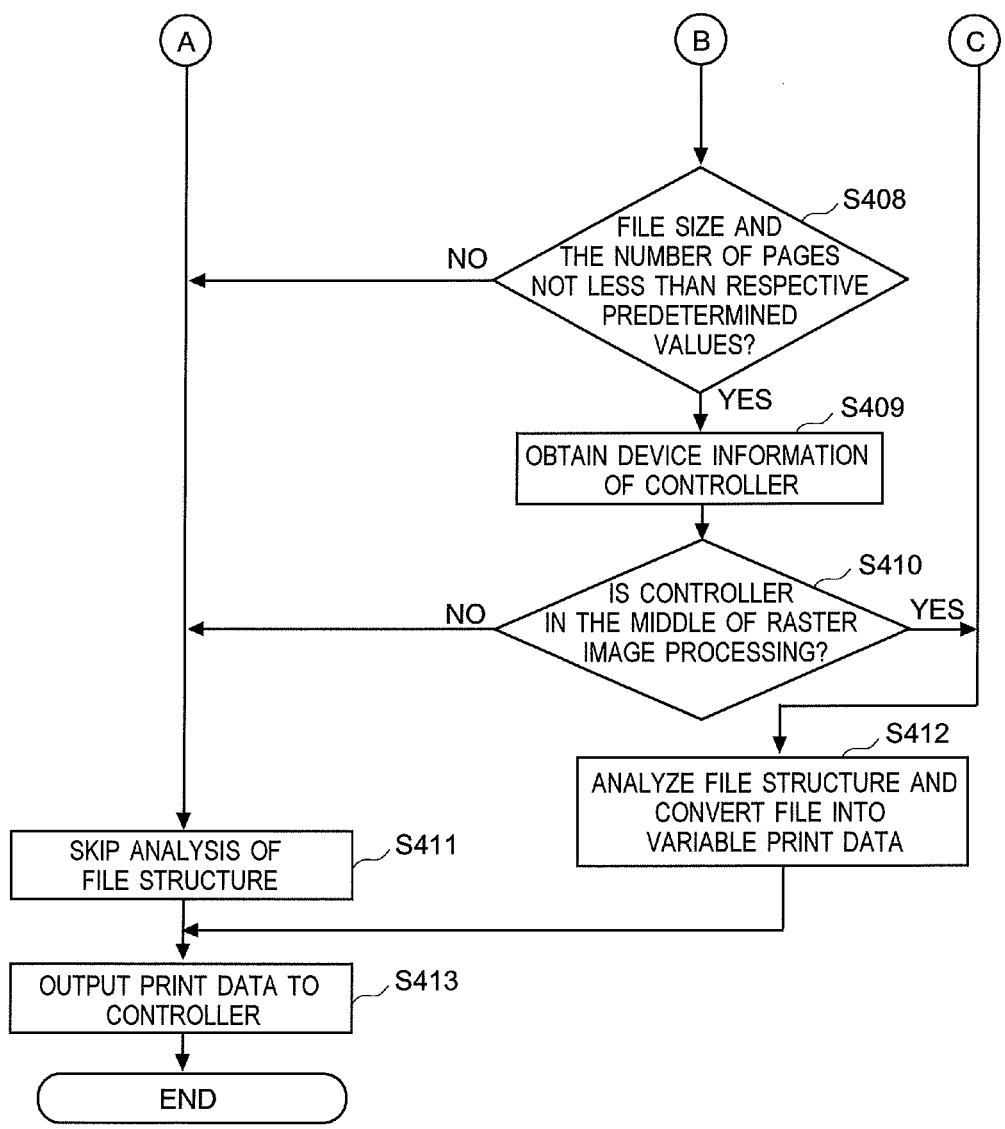

Next, description will be given to a print creation control program, a print control apparatus, and a print control method pertaining to Example 4 with reference to FIGS. 14A and 14B. FIGS. 14A and 14B are a flowchart illustrating an example of the operation of the print server pertaining to the present example.

In the above-mentioned Example 1, the print server is configured to determine whether to conduct or skip an analysis of the file structure of a document file on the basis of print setting information; in the above-mentioned Example 2, the print server is configured to determine whether to conduct or skip an analysis of the file structure of a document file on the basis of file information; and abovementioned Example 3, the print server is configured to determine whether to conduct or skip an analysis of the file structure of a document file on the basis of device information of controller 20. The print server may be configured to perform a combination of those types of control.

Hereinafter, description is given to an example of the operation of the print server 10 employing such control. CPU 11a loads the print control program stored in ROM 11b or storage section 12 onto RAM 11c and executes the program, thereby executing processing of each step shown in the flowchart in FIGS. 14A and 14B.

First, control section 11 (image obtaining section 16) of print server 10 obtains print setting information appended to a document file input into print server 10 (S401), and confirms, on the basis of the print setting information obtained, whether the number of copies of a document to be printed is set to one copy in the setting information (S402). If the number of copies is not set to one copy, control section 11 (file-structure analyzing section 17) determines that there is a low probability that the document file is a specific type of data which can be converted into variable print data (estimates that the document file is not the specific type of data), skips an analysis of the file structure of the document file (S411), and outputs the document file as it is to controller 20 (S412).

If confirming that the number of copies is set to one copy, the control section 11 further confirms, on the basis of the print setting information obtained, whether post-print processing or finishing to be performed on the entire document is specified in the print setting information (S403). If postprint processing (finishing), such as making a booklet or stapling printed pages, to be performed on the entire document is specified, control section 11 (file-structure analyzing section 17) determines that there is a low probability that the document file is a specific type of data which can be converted into variable print data (estimates that the document file is not the specific type of data), skips an analysis of the file structure of the document file (S411), and outputs the document file as it is to controller 20 (S413).

If confirming that post-print processing to be performed on the entire document is not specified, control section 11 (file-structure analyzing section 17) confirms, on the basis of print setting information obtained, whether the a paper size to be used for printing the document file is set to a postcard size or a size of multiple postcards and whether double-sided printing to be performed on the document file is specified in the print setting information (S404). If the print size is set to a postcard size or a size of multiple postcards and double-sided printing is specified in the print setting information, control section 11 (file-structure analyzing section 17) determines that there is a high probability that the document file is a specific type of data which can be converted into variable print data (estimates that the document file is the specific type of data), and conducts an analysis of the file structure of the document file, and then control section 11 (data converting section 18) converts the document file into variable print data in accordance with a result of the analysis (S412) and outputs the variable print data to controller 20 (S413).

If confirming that the paper size to be used for printing is not set to one of a postcard size and a size of multiple postcards, or confirmed that double-sided printing is not specified, control section 11 (file-structure analyzing section 17), on the basis of print setting information obtained, confirms per-page settings (post-print processing to be performed per page), that is, confirms whether post-print processing to be performed on each set of a certain number of pages of the document is specified in the print setting information (S405). If confirming that making a booklet or stapling to be performed on each set of pages (each set of a certain number of pages) is specified in the print setting information, control section 11 (file-structure analyzing section 17) determines that there is a high probability that the document file is a specific type of data which can be converted into variable print data (estimates that the document file is the specific type of data), and conducts an analysis of the file structure of the document file, and then control section 11 (data converting section 18) converts the document file into variable print data in accordance with a result of the analysis (S412) and outputs the variable print data to controller 20 (S413).

If confirming that post-print processing to be performed on each set of a certain number of pages is not specified in the print setting information, control section 11 obtains file information, such as information of paper sizes of pages contained in the document file, the file size and the number of pages contained in the document file, from a header of a document file input into print server 10 or created in print server 10 (S406). Next, control section 11 (file-structure analyzing section 17) confirms whether the document file includes mixed-size pages (document to be printed onto mixed-size sheets) and whether the order of the sizes of the pages has a regularity (S407). If confirming that the document file includes mixed-size pages and the order of the sizes of the pages has a regularity, control section 11 (file-structure analyzing section 17) determines that there is a high probability that the document file is a specific type of data which can be converted into variable print data (estimates that the document file is the specific type of data) and conducts an analysis of the file structure of the document file, and then control section 11 (data converting section 18) converts the document file into variable print data in accordance with a result of the analysis (S412) and outputs the variable print data to controller 20 (S413).

If confirming that the document file does not include mixed-size pages or the order of the sizes of the pages does not have a regularity, control section 11 (file-structure analyzing section 17) confirms, on the basis of the file information, whether the file size and the number of pages of the document file are equal to or greater than certain values predetermined respectively (S408). If confirming that the file size is less than a predetermined size and/or the number of pages is less than a predetermined number, control section 11 (file-structure analyzing section 17) determines that there is a low probability that the document file is a specific type of data which can be converted into variable print data, skips the analysis of the file structure (S411), and outputs the document file as it is to controller 20 (S413).

If confirming that the file size is equal to or greater than a predetermined size and the number of pages is equal to or greater than a predetermined number, control section 11 obtains, from controller 20, device information (S409). If controller 20 is in the middle of performing raster image processing, control section 11 (file-structure analyzing section 17) conducts an analysis of the file structure of the document file, and in accordance with a result of the analysis, control section 11 (data conversion section 18) converts the document file into variable print data (S412), and outputs the variable print data to controller 20 (S413). On the other hand, if controller 20 is not in the middle of performing raster image processing, control section 11 (file-structure analyzing section 17) skips an analysis of the file structure of the document file (S411), and outputs the document file as it is to controller 20 (S413).

As described above, the print control apparatus is configured to perform the control which includes determining whether to conduct an analysis of the file structure of a document file, on the basis of print setting information, file information and device information. With this control, a problem that time to analyze the file structure is wasted can be avoided before it happens, and effective print processing can be achieved.

The present invention should not be limited to the above examples, and the constitution and control of the printing system and each apparatus can be modified appropriately unless such modification deviates from the intention of the present invention.

For example, in each of the above-mentioned examples, print setting information, file information and device information were used for specific information which is a criterion of determining whether to conduct or skip an analysis of the file structure. As the print setting information, pieces of information of settings of the number of copies of a document to be printed, a paper size to be used for printing a document file, double-sided printing to be performed on a document file, and post-print processing (finishing) to be performed on a document were cited. As the file information, pieces of information of paper sizes of pages contained in a document file, the file size and the number of pages contained in a document file were cited. As the device information, information about whether controller 20 is in the middle of performing raster image processing was cited. However, those were given by way of illustration only, and it should be noted that arbitrary information can be used as far as the print control apparatus can determine, on the basis of the information, whether there is a high probability that a document file is a specific type of data which can be converted into variable print data.

The present invention is applicable to a print control program which, when being executed, causes an apparatus to analyze a file to be printed and create a file for variable printing; a non-transitory computer-readable storage medium storing the print control program; a print control apparatus, such as a print server, configured to execute the print control program; and a printing system including the print control apparatus.

The invention claimed is:

1. A non-transitory computer-readable storage medium storing a print control program to be executed in a print control apparatus which outputs print data based on a document file to an image processing apparatus which performs raster image processing, the print control program, when being executed by a processor of the print control apparatus, causing the print control apparatus to perform processing comprising:
   obtaining information about a document file or the image processing apparatus;
   conducting an analysis of the obtained information, and determining whether or not to conduct or skip an analysis of the document file to be printed;
   wherein the analysis of the obtained information includes at least one of the following:
      determining whether the document file includes a type of data that can be converted into variable print data; and
      obtaining device information about the image processing apparatus and determining whether to conduct or skip an analysis of the document file to be printed based on the obtained device information;
   when it is determined to conduct the analysis of the document file to be printed, then:
      conducting an analysis including identifying portions of the document file that include variable data portions and classifying contents of the document file into fixed data portions and the variable data portions;
      converting the document file into variable print data; and
      outputting the variable print data to the image processing apparatus; and
   when it is determined not to conduct the analysis of the document file to be printed, then outputting the document file to the image processing apparatus without the analysis that includes identifying VDP data portions.

2. The non-transitory computer-readable storage medium of claim 1,
   wherein the obtaining the information, includes
      obtaining print setting information appended to the document file, and analyzing the file structure, includes
      determining whether the document file is a type of data which can be converted into variable print data, on a basis of the print setting information.

3. The non-transitory computer-readable storage medium of claim 2,
   wherein the print setting information includes a piece of information of a number of copies of a document to be printed, and
   the analyzing the file structure, includes
      on the number of copies being set to one copy in the print setting information, determining that there is a high probability that the document file is the type of data.

4. The non-transitory computer-readable storage medium of claim 2,
wherein the print setting information includes a piece of information of a number of copies of a document to be printed and a piece of information of post-print processing to be performed on the document, and
the analyzing the file structure, includes
on the number of copies being set to one copy and post-print processing on the entire document being set in the print setting information, determining that there is a low probability that the document file is the type of data.

5. The non-transitory computer-readable storage medium of claim 2,
wherein the print setting information includes a piece of information of a paper size to be used for printing the document file and a piece of information of double-sided printing to be performed on the document file, and
the analyzing the file structure, includes
on the print size being set to a postcard size or a size of multiple postcards and double-sided printing being set in the print setting information, determining that there is a high probability that the document file is the type of data.

6. The non-transitory computer-readable storage medium of claim 2,
wherein the print setting information includes a piece of information of post-print processing to be performed per page, and
the analyzing the file structure, includes
on post-print processing to be performed on each set of a certain number of pages of the document being set in the print setting information, determining that there is a high probability that the document file is the type of data.

7. The non-transitory computer-readable storage medium of claim 2,
wherein the file information includes a piece of information of paper sizes of pages contained in the document file, and
the analyzing the file structure, includes
on the document file containing mixed-size pages and an order of paper sizes of the pages having a regularity, determining that there is a high probability that the document file is the type of data.

8. The non-transitory computer-readable storage medium of claim 2,
wherein the file information includes a file size of the document file and a number of pages contained in the document file, and
the analyzing the file structure, includes
on the file size being equal to or greater than a predetermined size and the number of pages being equal to or greater than a predetermined number, determining that there is a high probability that the document file is the data.

9. The non-transitory computer-readable storage medium of claim 1,
wherein the device information indicating an operation status of the image processing apparatus.

10. A print control apparatus which outputs print data based on a document file to an image processing apparatus which performs raster image processing, the print control apparatus comprising a hardware processor configured to:
obtain information about a document file or the image processing apparatus;
conduct an analysis of the obtained information, and determine whether or not to conduct or skip an analysis of the document file to be printed;
wherein the analysis of the obtained information includes at least one of the following:
determining whether the document file includes a type of data that can be converted into variable print data; and
obtaining device information about the image processing apparatus and determining whether to conduct or skip an analysis of the document file to be printed based on the obtained device information;
when it is determined to conduct the analysis of the document file to be printed, then:
conduct an analysis including identifying portions of the document file that include variable data portions and classifying contents of the document file into fixed data portions and the variable data portions; and
convert the document file into variable print data and output the variable print data to the image processing apparatus; and
when it is determined not to conduct the analysis of the document file to be printed, then outputting the document file to the image processing apparatus without the analysis that includes identifying VDP data portions.

11. The print control apparatus of claim 10,
wherein the hardware processor obtains print setting information appended to the document file, and
the hardware processor
determines whether the document file is a type of data which can be converted into variable print data, on a basis of the print setting information.

12. The print control apparatus of claim 11,
wherein the print setting information includes a piece of information of a number of copies of a document to be printed, and
on the number of copies being set to one copy in the print setting information, the hardware processor determines that there is a high probability that the document file is the type of data.

13. The print control apparatus of claim 11,
wherein the print setting information includes a piece of information of a number of copies of a document to be printed and a piece of information of post-print processing to be performed on the document, and
on the number of copies being set to one copy and post-print processing on the entire document being set in the print setting information, the hardware processor determines that there is a low probability that the document file is the type of data.

14. The print control apparatus of claim 11,
wherein the print setting information includes a piece of information of a paper size to be used for printing the document file and a piece of information of double-sided printing to be performed on the document file, and
on the print size being set to a postcard size or a size of multiple postcards and double-sided printing being set in the print setting information, the hardware processor determines that there is a high probability that the document file is the type of data.

15. The print control apparatus of claim 11,
wherein the print setting information includes a piece of information of post-print processing to be performed per page, and on post-print processing to be performed on each set of a certain number of pages of the document being set in the print setting information, the hardware processor determines that there is a high probability that the document file is the type of data, and conducts the analysis.

16. The print control apparatus of claim 11,
wherein the file information includes a piece of information of paper sizes of pages contained in the document file, and
on the document file containing mixed-size pages and an order of paper sizes of the pages having a regularity, the hardware processor determines that there is a high probability that the document file is the type of data.

17. The print control apparatus of claim 11,
wherein the file information includes a file size of the document file and a number of pages contained in the document file, and
on the file size being equal to or greater than a predetermined size and the number of pages being equal to or greater than a predetermined number, the hardware processor determines that there is a high probability that the document file is the data.

18. The print control apparatus of claim 10,
wherein the device information indicating an operation status of the image processing apparatus.

* * * * *